Feb. 21, 1933.  E. R. EVANS  1,898,434
VEHICLE BRAKE MECHANISM
Original Filed Sept. 4, 1923  4 Sheets-Sheet 3
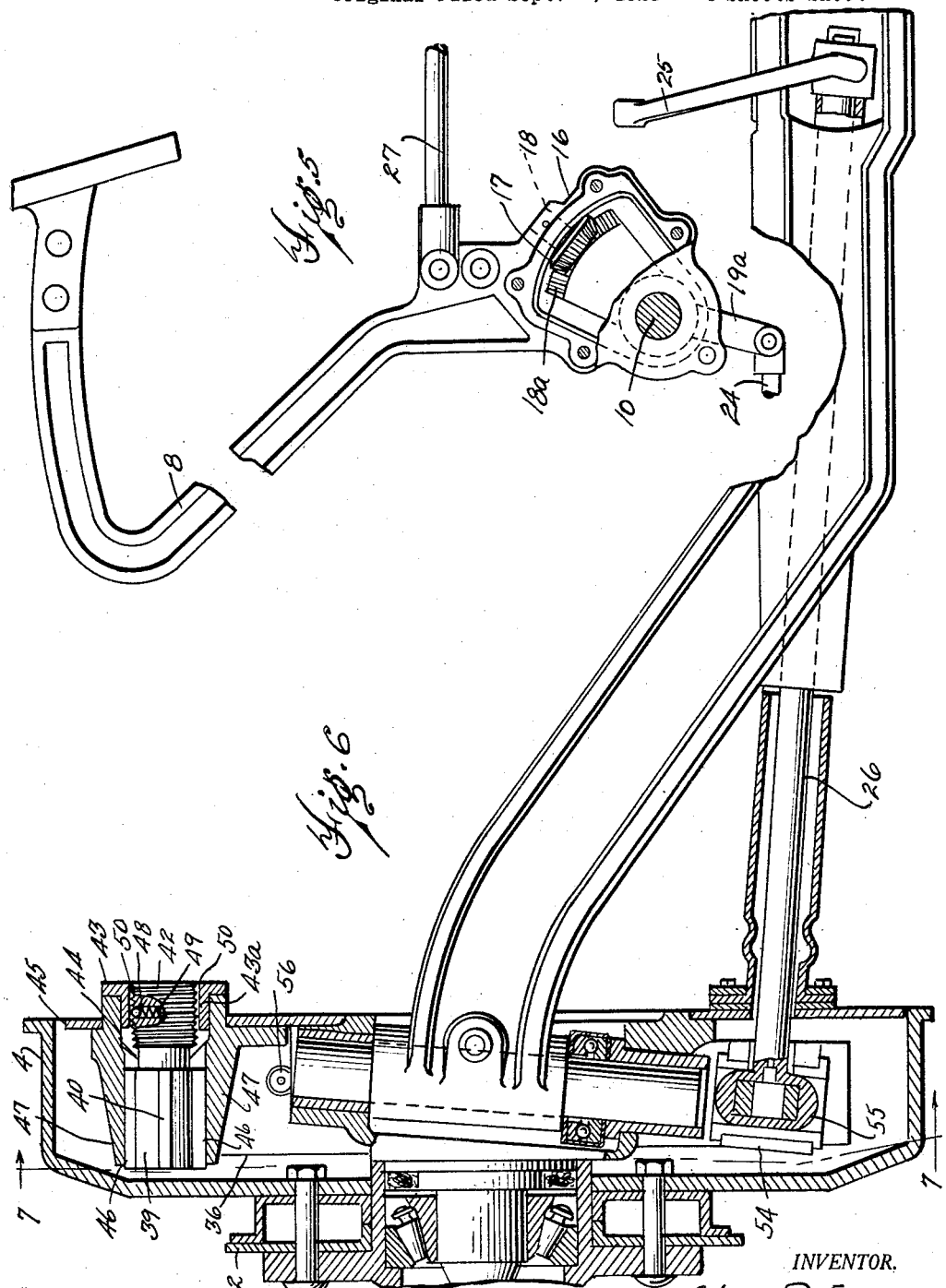
INVENTOR.
Edwin R. Evans
BY
Whittemore, Hulbert, Whittemore, & Belknap
ATTORNEYS Feb. 21, 1933.  E. R. EVANS  1,898,434
VEHICLE BRAKE MECHANISM
Original Filed Sept. 4, 1923  4 Sheets-Sheet 4
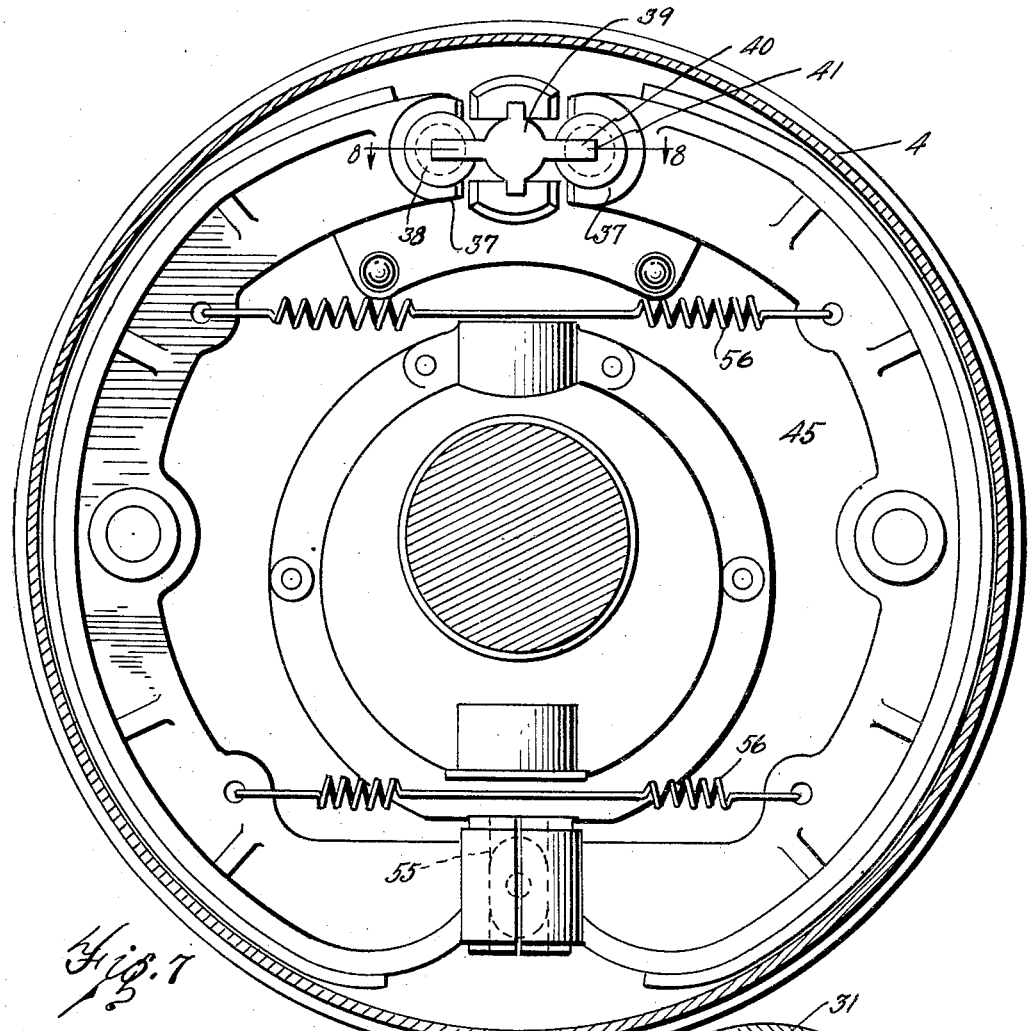
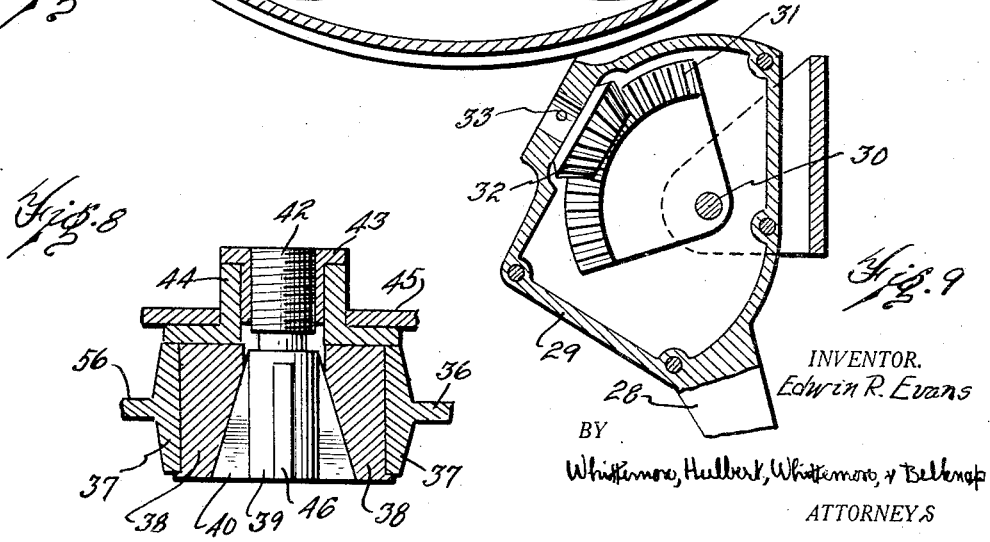
INVENTOR.
Edwin R. Evans
BY
Whittemore, Hulbert, Whittemore, & Belknap
ATTORNEYS Patented Feb. 21, 1933

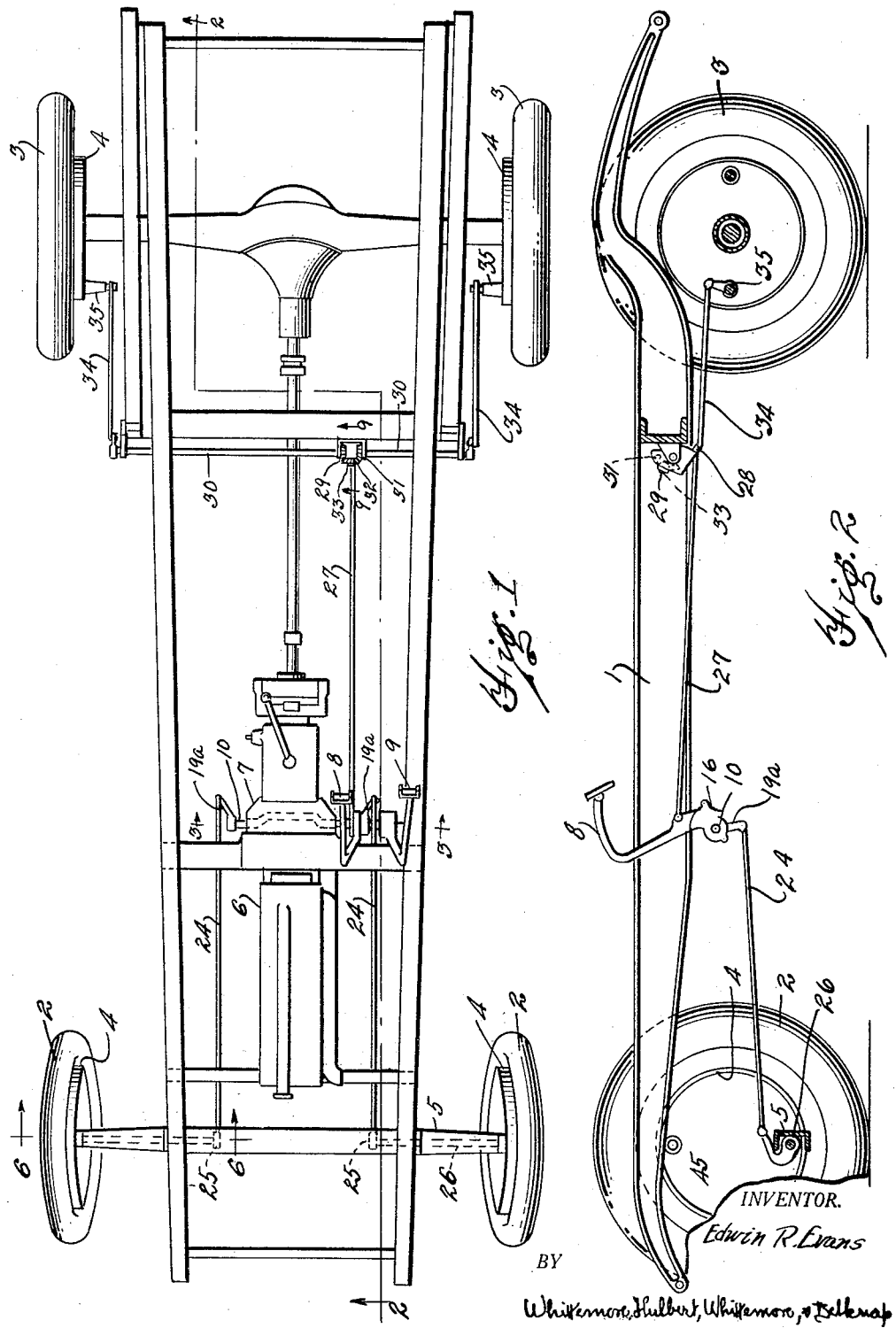

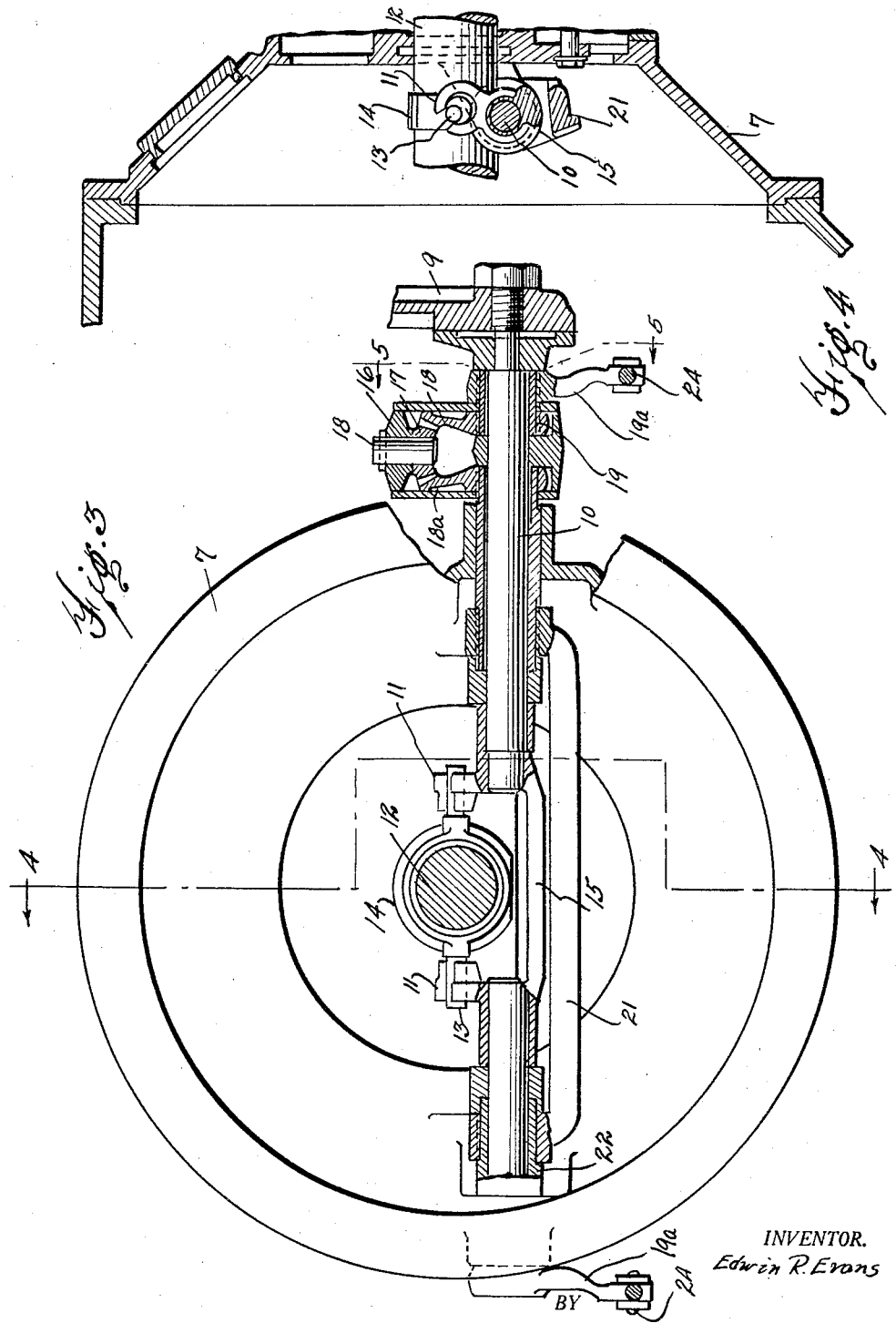

1,898,434

UNITED STATES PATENT OFFICE

EDWIN R. EVANS, OF CHICAGO, ILLINOIS

VEHICLE BRAKE MECHANISM

Original application filed September 4, 1923, Serial No. 660,855. Divided and this application filed May 5, 1924. Serial No. 711,278. Renewed September 25, 1929.

This invention relates to vehicle brake mechanisms and particularly relates to mechanisms including both front and rear wheel brakes. This application is a divisional of copending application Serial Number 660,855, now Patent No. 1,648,168, November 8, 1927 and Reissue #17,688.

The invention consists in a provision for properly proportioning the braking forces applied to the several wheels from a common controlling member.

In the drawings:

Figure 1 is a plan view of a vehicle chassis equipped with the improved brake mechanism;

Figure 2 is a sectional view of the same on line 2—2 of Figure 1;

Figure 3 is a cross section on line 3—3 of Figure 1 showing the relation of the clutch control and the brake control mechanisms;

Figure 4 is a vertical sectional view of the same on line 4—4 of Figure 3;

Figure 5 is a section on line 5—5 of Figure 3 showing primarily the brake control pedal and connected parts;

Figure 6 is a section on line 6—6 of Figure 1 showing one of the front wheel brake mechanisms;

Figure 7 is a vertical section on line 7—7 of Figure 6;

Figure 8 is a section on line 8—8 of Figure 7 showing the adjustable mounting for the brake shoes;

Figure 9 is a detail sectional view taken upon line 9—9 of Figure 1 showing mechanism for equalizing the braking force transmitted to the two rear wheels.

In these views, the reference character 1 designates the frame of a motor vehicle and 2 and 3 the front and back wheels thereof, each of said wheels being provided with a brake drum 4. 5 is the front axle, 6 the engine, 7 the clutch housing, 8 the brake control pedal and 9 the clutch control pedal. The pedal 9 is mounted in the clutch housing 7 and within said housing carries a pair of lugs 11 upstanding at opposite sides of the transmission shaft 12 to engage trunnions 13 upon the clutch release collar 14. Preferably the shaft 10 comprises portions at opposite sides of the transmission shaft 12 and rigidly connected by a yoke member 15 which is downwardly offset to clear the shaft 12 and collar 14. The lower end portion of the brake control pedal 8 forms a casing 16 which is journaled upon the shaft 10 between the clutch pedal lever 9 and the housing 7. Within said casing, a bevelled pinion 17 is journaled upon a stub shaft 18 carried by said casing in a radial relation to the shaft 10. Said pinion is oppositely engaged, within said casing, by segmental bevel gears $18^a$, one of which is fast upon a short tubular shaft 19 journaled upon the shaft 10 exteriorly of the housing 7, one of the front brake control levers $19^a$ also being fast upon said tubular shaft. The other gear $18^a$ is fast upon a longer tubular shaft 20, also journaled upon the shaft 10 and extending into said housing. A yoke bar 21 offset downwardly below the yoke 15, rigidly connects the shaft 20 through a pull rod 27 pivoted to said lever with a tubular shaft 22 journaled upon the shaft 10 at the opposite side of the transmission shaft 12, said shaft 22 projecting exteriorly of the casing 7 to mount the other front brake control lever $19^a$. The levers $19^a$ are pivotally engaged by rods 24 which extend forwardly to pivotally engage arms 25 upon the cam shafts 26 of the front wheel brakes. The brake control foot lever 8 is adapted to actuate the rear brakes through a pull rod 27 pivoted to said lever just above the gear casing 16. Said rod extends rearwardly to engage an arm 28 integrally depending from a casing 29 journaled upon the adjacent ends of two aligned rock shafts 30 mounted transversely of the frame 1. Within the casing 29, the shafts 30 rigidly carry gear segments 31 which mesh with a bevel pinion 32 journaled between said segments upon a stud shaft 33 carried by the casing 29. The outer ends of the rock shafts 30 are respectively connected by pull rods 34 to the cam shaft 35 of the rear brakes.

Considering now the operation of the invention as so far described, upon actuation of the foot lever 8, the resultant rocking of the casing 16, rigidly carried by the lower end of said lever, causes the pinion 17, carried by said casing to form through its engagement with the gear segments 18ª a means for subjecting said segments to an equalized rocking movement. As is well understood, the pinion 17 will adjust itself relative to the segments 18ª so as to equalize the effort transmitted through each of said segments. This equalized effort is transmitted from said segments through the pull rods 24 to the front brakes. The concentric mounting of the brake shaft 20 and clutch shaft 10 simplifies the mechanism and further produces a compact unit assembly for the main clutch and brake rock shafts. This assembly is made possible primarily by employment of the offset connections 15 and 21 between the portions of said shafts at opposite sides of the engine shaft.

Equalization of the braking effect acting upon the two front wheels and a similar equalization as regards the rear brakes is assured by the gearings 17, 18ª and 31, 32. There will presently be described a provision for equalization of the total efforts applied to the front and rear wheel brakes or establishment of a desired proportion between said efforts.

Describing now the specific mounting of the brake shoes of each brake, 36 designates a pair of complementary semi-circular brake shoes interiorly engageable with each drum 4. The upper ends of said shoes are formed with adjacent pivot bearings 37 in which are respectively engaged cylindrical pivot members 38. As is best seen in Figure 7, said bearings have openings in their opposing faces, said openings being of a lesser transverse extent than the interior diameter of the bearings so that the pivot members 38 cannot escape from the bearings through said openings. Between said bearings there is mounted a wedge member comprising a cylindrical body 39 having diametrically opposed ribs 40, the edges of which incline oppositely to the axis of the wedge member. Said ribs project through the lateral openings in the bearings 37 and engage in grooves respectively formed in the pivot members 38, said grooves having their bottom faces inclined correspondingly to the edge faces of said ribs. The wedge body 39 has a threaded extension 42 engaged by an adjusting nut 43 mounted in a supporting bracket 44. The latter is secured to a plate 45 forming a closure for the brake drum. The wedge body is formed with upwardly and downwardly projecting splines 46 which engage in spline ways 47 formed as integral projections from the bracket 44, above and below the wedge member and between the bearings 37. Thus the wedge member is held from rotation but is free to slide in parallelism with the pivotal axes of the two brake shoes responsive to tightening of the adjusting nut 43. The effect of such tightening is to enter the wedge member 39, increasingly between the pivot members 38 so as to force the latter apart. The described construction is such that the two brake shoes may turn freely upon the pivot members 38, the latter however, being restrained by the wedge ribs 40 from any rotation.

In properly proportioning the total front and rear braking effort the nuts 43 are first all tightened so as to firmly engage the brake shoes with the brake drums. If it be desired to equalize the front and rear braking efforts all of said nuts are then loosened to the same extent or the nuts of the front and rear brakes may be differentially loosened to establish a desired proportion between the front and rear braking efforts. A ball detent 48 bearing upon the sleeve portion 43ª of the nut and under stress of a spring 49 snaps into sockets 50 circumferentially spaced in said sleeve portion and serves both to retain the nut against accidental turning and to indicate to the operator a definite fractional part of a turn.

As shown in Figure 6 the cam shaft 26 is rotatably supported at its inner end by a bearing on the axle 5 closely adjacent the operating lever 25. At its outer end the shaft 26 carries a cam 55 which fits between the vertically channeled head portions 54 of the brake shoes 36. It will be noted that the center of the cam 55 is substantially on the swiveling axis of the front wheel, as shown in Figure 6. The two shoes are drawn together upon the cam 55 by their springs 56 and may move as a unit with the cam 55, since there is a sufficient free length of the shaft 26 between its bearing on the axle and the cam 55 to allow such slight flexing as may be necessary to permit the movement required.

What I claim as my invention is:—

In a front wheel brake operating mechanism, in combination with a front wheel swiveled on the front axle, a brake drum carried by and swiveling with the front wheel, a pair of brake shoes interiorly expandable into engagement with said drum, a cam between the free ends of said brake shoes having its center substantially on the swiveling axis of said front wheel, said cam being bodily movable with said shoes relative to said drum, a cam shaft supported at one end by said cam and rotatably supported at its inner end of said axle.

In testimony whereof I affix my signature.

EDWIN R. EVANS.